United States Patent
Sobotta

[11] 3,861,794
[45] Jan. 21, 1975

[54] MAGAZINE TYPE SLIDE PROJECTOR WITH AUTOMATIC FOCUSING MEANS

[75] Inventor: Reinhard Sobotta, Mascherode, Germany

[73] Assignee: Roller-Werke Franke & Heidecke, Braunschweig, Germany

[22] Filed: Oct. 19, 1973

[21] Appl. No.: 408,054

[30] Foreign Application Priority Data
Oct. 21, 1972 Germany.................... 2251757

[52] U.S. Cl. ............................................. 353/101
[51] Int. Cl. ............................................. G03b 3/10
[58] Field of Search ............... 353/69, 101; 352/140

[56] References Cited
UNITED STATES PATENTS
3,628,863  12/1971  Kottler ............................. 353/101

FOREIGN PATENTS OR APPLICATIONS
1,913,387  10/1969  Germany ........................... 353/101
1,278,243  10/1961  France .............................. 353/101

Primary Examiner—Harry N. Haroian
Attorney, Agent, or Firm—Stonebraker & Shepard

[57] ABSTRACT

A slide projector of the magazine type, having provision for so-called "automatic focusing" to keep the picture slide image properly focused on the screen even when the slide buckles during projection on account of the heat of the light source. The projection lens has a motor drive controlled by the "automatic focusing" optical system which is mounted on a sliding carriage separate from the projection lens. Normally the sliding carriage is coupled to the projection lens to move therewith, so that when the automatic focusing optical system causes the projection lens motor to move the projection lens to a different position, the sliding carriage will move with it, until the automatic focusing optical system indicates that the focus has been corrected. The motor drive for the projection lens also has a remote control so that the operator can, from a distance, move the projection lens axially, as for example to focus on a different position of the viewing screen, and when this remote control is operated, the coupling between the sliding carriage and the projection lens is automatically disconnected so that the sliding carriage will not move with the projection lens at this time.

12 Claims, 1 Drawing Figure

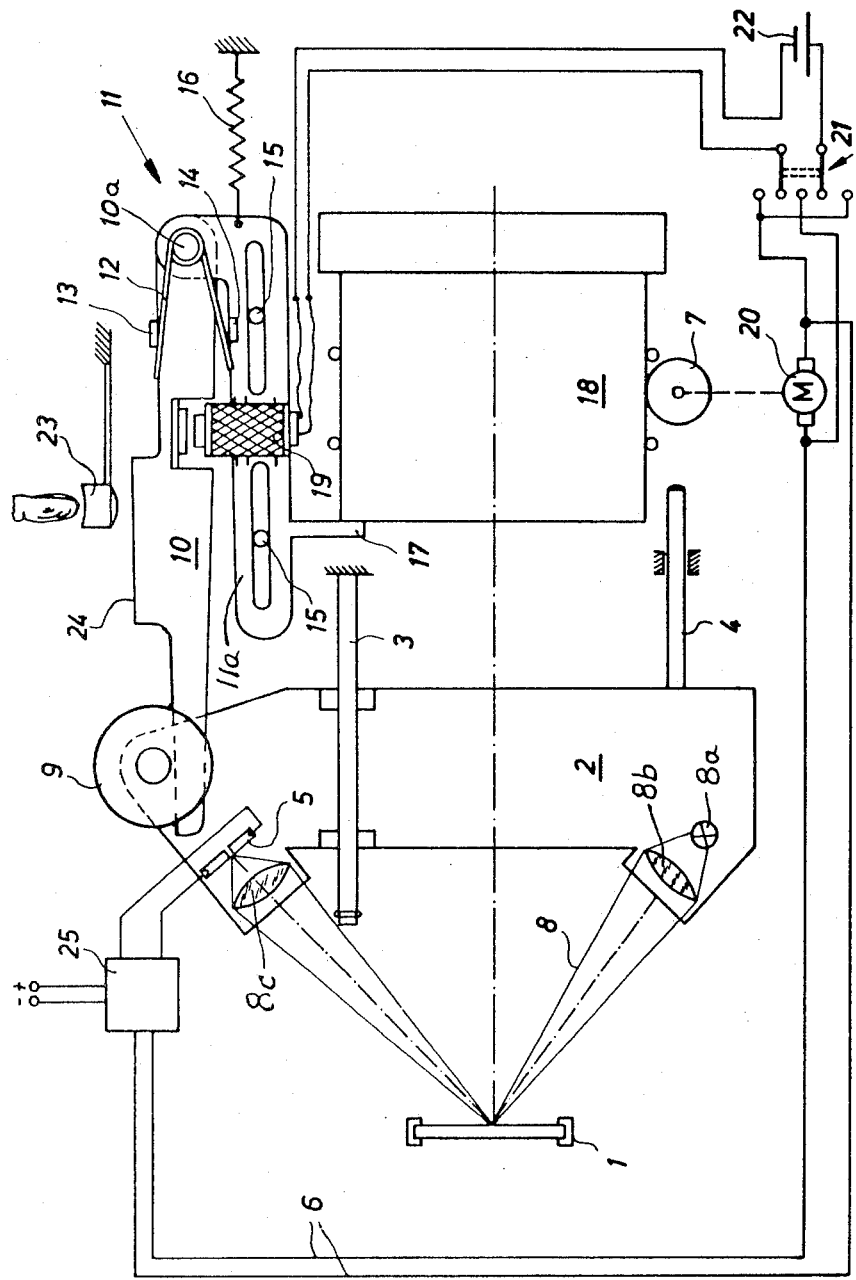

MAGAZINE TYPE SLIDE PROJECTOR WITH AUTOMATIC FOCUSING MEANS

BACKGROUND OF THE INVENTION

Many kinds of "automatic focus" projectors are known in the art; that is, projectors with provision for restoring correct focus if the film buckles or shifts during projection, this usually being due to the effect of heat from the projection lamp. Typical examples of known apparatus are the constructions shown in British Pat. No. 823,404, published 1959 (Robinson, Essoldomatic), German auslegeschrift No. 1,127,617, published 1962 (Korf, Feinmess), and U.S. Pat. Nos. 2,947,215, 1960 (Mitchell), 3,037,423, 1962 (Shurcliff), 3,205,766, 1965 (Ewald), and 3,249,001, 3,249,006, and 3,249,007, 1966 (Stauffer). See also French Pat. No. 903,962, published 1945 (Tobis).

These constructions known in the prior art have certain disadvantages. For example, in some of the prior constructions, one motor will serve to restore a focus which has become incorrect on account of buckling, and will not serve to change the focus if the screen is moved to a different distance. If a remote control of focusing onto the screen is desired (as distinguished from correction of focus error due to buckling or the like) a second motor is required.

An object of the present invention is to overcome these and other drawbacks, and to provide a generally improved and more satisfactory projector, particularly a picture slide projector of the magazine type.

Another object of the invention is to provide a projector where a single motor is operated automatically to correct a focus which has become faulty on account of buckling of the film (the picture slide) which motor can also be manually controlled from a remote point to effect proper focusing independently of the matter of buckling of the film, as for example if the viewing screen is shifted backwardly or forwardly to a different location.

Basically, the known automatic focusing systems can be more accurately described as systems by means of which a pre-selected distance is maintained between the image carrier (that is, the picture slide or other film) and the objective lens or projection lens. These devices compensate only for displacement of the image carrier, due to buckling or the like, but do not allow for any compensation when, for instance, the image on the viewing screen becomes blurred as a result of a displacement of the screen. In such a case, the distance between the projection lens and the automatic focusing device has had to be altered by hand, in order to obtain a satisfactory sharp image on the viewing screen.

The present invention, however, provides a magazine type slide projector having automatic focusing, and also having provision for enabling the sharpness of the image on the screen to be corrected from a distance (that is, by remote control) either before or during the projection, in the usual manner, without requiring a manual correction to be made at the projector itself.

BRIEF DESCRIPTION OF THE DRAWING

The single FIGURE is a schematic view of a projector according to one embodiment of the present invention.

DESCRIPTION OF THE PREFERRED EMBODIMENT

Referring to the schematic showing in the drawing only those parts of the invention which are necessary to an understanding of the invention are shown. Conventional parts such as the projection lamp, the projector housing or casing, the picture slide magazine, and the slide changing mechanism for moving slides from the magazine to projection position and back from projection position to the magazine, are not illustrated.

The image carrier (that is, the picture slide) in projection position is indicated at 1. A sliding carriage 2, movable in the direction of the optical axis and guided by guiding members 3 and 4, is provided, at the top, with two photo-electric cells 5. The photo-electric cells 5 are operatively connected with the projection lens focusing motor 20 via a connecting circuit 6. The focusing motor 20, acting through a slip clutch 7, drives the objective or projection lens 18 in one direction or another along the optical axis, and with it the sliding carriage 2, through connections to be described later, until the photo-electric cells 5 no longer emit any signal, that is, until the automatic focusing ray 8 comes to rest exactly between the two photo-electric cells 5. The ray 8 is derived from a bulb or other suitable light source 8a carried by the sliding carriage 2 and focused by lens means 8b also carried by the carriage, so as to fall on the picture slide 1 at or approximately at the center thereof, and then to be reflected, the reflected beam being concentrated and focused by the lens means 8c into the space between the two photocells 5. As well understood in the art, any displacement of the center of the projection slide 1 either forwardly or rearwardly along the optical axis, as for example by buckling due to heat, will displace the reflected beam so that it falls on one or the other of the two photocells 5 rather than falling in the space between them, thus activating the motor 20 to move the projection lens 18 axially until correction is achieved, whereupon the reflected beam will once more fall between the two photocells and the motor 20 will stop.

The upper end of the automatic focusing sliding carriage 2 also has a non-rotatable tapering roller 2 elastically engaged by the wedge-shaped upper edge of a lever 10 of a displaceable slide indicated in general at 11. The forward end of this lever 10 is pivoted at 10a to another part 11a of this slide assembly, the part 11a being guided for movement in the direction of the optical axis by fixed guide pins 15 engaging elongated slots in the slide part 11a, as shown. A hairpin spring 12 reacts against an ear 13 on the part 10 and an ear 14 on the part 11a, constantly tending to swinging the lever 10 upwardly on its pivot 10a, to keep the wedge-shaped rear or left end thereof firmly engaged with the non-rotatable tapering roller 9, to form a driving coupling therewith.

The entire slide assembly 11 (that is, both the parts 10 and 11a) is urged in a forward direction, parallel to the optical axis, by a spring 16. The slide part 11a has a lug 17 engaging a suitable abutment on the amount of the projection lens 18, such as engaging the rear end thereof. By reason of the parts 16 and 17, the slide assembly 11 follows along with the projection lens, remaining in fixed axial position relative thereto. The slide part 11a is provided near its center with an electromagnet 19 fixed thereto, cooperating with an armature on the lever 10 to draw the lever 10 slightly downwardly against the force of the spring 12, when the electromagnet 19 is energized. The magnet is energized by the circuit illustrated, whenever the pole changing switch 21 is moved from its central or neutral position to one or the other of its extreme positions, to cause the motor 20 to be operated in one direction or the other from any suitable source of electrical energy, indicated schematically by the battery 22. This pole changing switch 21 may be located remotely, at some distance from the projector. As already indicated, the motor 20 can also be operated in one direction or the other by the automatic focusing system, under the control of the reflected light beam falling on one or the other of the photoelectric cells 5, acting through the relays and control mechanism 25 of conventional design.

When the lever 10 is in its normal position, held tightly against the member 9 by the spring 12, these parts constitute a driving connection coupling the sliding carriage 2 to the slide assembly 11, which in turn is coupled to the projection lens 18 by means of the lug 17 and spring 16. Thus any longitudinal movement of the projection lens 18, caused by operating the driving motor 20 in one direction or the other, will normally be accompanied by corresponding longitudinal movement of the slide carriage 2. But when the motor is driven from the switch 21 rather than through the automatic focusing control, the magnet 19 will be energized, pulling the lever 10 down so that it no longer engages the member 9, thus disconnecting the driving connection between the parts 2 and 18, so that the projection lens 18 can be moved independently of the sliding carriage 2.

This disconnection of the coupling between the members 2 and 18 can also be accomplished manually by finger pressure exerted downwards on a press button 23, the lower end of which engages a flat upper surface 24 on the lever 10. Finger pressure on the button 23 has the same effect as energization of the magnet 19, in disconnecting the coupling, so that the projection lens 18 can be focused independently of the sliding carriage 2, such focusing being possible by the conventional manual focusing knob on the projector.

It is believed the operation will be clear from what has been said above, but it may be briefly summarized as follows:

When the first picture slide has been moved from the magazine into the projector, in projection position as illustrated at 1, the image thereof is properly focused to produce a sharp image on the viewing screen, by longitudinal or axial movement of the projection lens 18, either performed from the manual focusing knob or the projector while holding the button 23 down, to disconnect the coupling between the parts 2 and 18, or by use of the remote control switch 21, which likewise disconnects the coupling by action of the magnet 19. It is assumed that at this time the reflected light beam of the automatic focus control will fall between the two photoelectric cells 5, so that the motor 20 is not activated through the mechanism 25. If not, any necessary slight adjustment can be made by reestablishing the coupling between members 9 and 10, and moving the lens 18 by hand to move the sliding carriage 2 with it to the necessary extent.

If, during the progress of a projection sequence, one or another of the picture slides buckles so that the center thereof comes closer to or farther from the projection lens 18, thus blurring the image on the viewing screen, this is automatically corrected by the automatic focusing mechanism above described. Because of the axial shifting of the center of the buckled picture slide, the reflected beam from the lamp 8a falls on one or the other of the photoelectric cells 5, and through the control mechanism 25 this drives the motor 20 in one direction or the other, until the focus is corrected.

On the other hand, if the screen itself moves forwardly or backwardly, or if it is found that the original focusing was not quite perfect, this can be corrected by operating the switch 21, to drive the motor 20 in one direction or the other, and such operation will automatically energize the magnet 19 and disconnect the coupling 9, 10 between the parts 2 and 18, permitting refocusing of the projection lens 18 without disturbing the relationship of the sliding carriage 2 to the picture slide or image carrier 1. When the pole changing switch 21 is moved back to its central or neutral position, the magnet 19 is deenergized, the spring 12 moves the lever 10 upwardly into tight engagement with the member 9, and the frictional coupling between the parts 2 and 18 is reestablished.

In a simpler embodiment of the present invention, where no remote control is desired, the magnet 19 may be omitted as well as the switch 21 and the circuits thereof. In this simple embodiment, the initial focusing is performed by the manual focusing knob on the projector, meanwhile pressing the button 23 down, and the same procedure is used if refocusing is necessary on account of any movement of the screen closer to or farther from the projector. But any refocusing caused by buckling of the film is still accomplished automatically by the mechanism described.

It will be noted that the abutment portion 17 on the slide assembly 11 engages forwardly against a cooperating abutment portion of the projection lens mount 18. Thus it does not interfere in any way with changing the projection lens 18, if the projector is equipped with an interchangeable lens. The removing movement of an interchangeable lens is, of course, a movement in a forward direction, and the replacing movement of the same or different interchangeable lens is a movement in a rearward direction, which will automatically bring the lens mount into contact with the abutment portion 17 on the slide assembly 11, thus automatically reestablishing the cooperative relationship of the parts.

What is claimed is:

1. A slide projector comprising means for holding a picture slide in projection position, a projection lens movable in the direction of its optical axis for projecting an image of said slide onto a viewing screen, a carriage movable in the direction of said optical axis, automatic focusing light beam projecting means and receiving means both mounted on said carriage to move therewith, motor means controlled at least in part by said automatic focusing light beam projecting and receiving means for moving said projection lens axially, and disconnectable coupling means for coupling said carriage to said projection lens so that when said coupling means is effective, axial movement of said projection lens will cause corresponding axial movement of said carriage and said automatic focusing light beam means, and when said coupling means is ineffective, said projection lens may be moved axially by said motor means without tending to cause movement of said carriage or said automatic focusing light beam means.

2. A projector as defined in claim 1, further comprising spring means tending to keep said coupling means connected, and disconnecting means acting against the force of said spring means for rendering said coupling means disconnected.

3. A projector as defined in claim 2, wherein said disconnecting means includes a manually operable member.

4. A projector as defined in claim 3, wherein said manually operable member is a plunger reponsive to finger pressure.

5. A projector as defined in claim 3, wherein said disconnecting means includes an electromagnet and wherein said manually operable member is a manually operable switch effective to energize said magnet.

6. A projector as defined in claim 5, wherein said switch serves also to control operation of said motor means to move said projection lens axially independently of said carriage.

7. A projector as defined in claim 1, wherein said coupling means includes a coupling member moving with said lens, and a friction member mounted on said carriage, said coupling member normally engaging said friction member to establish a coupling connection between said lens and said carriage and being disengageable from said friction member to render said coupling means ineffective.

8. A projector as defined in claim 7, wherein said coupling member is a pivoted lever having a wedge shaped portion for wedging engagement with said friction member, and said friction member is in the form of a non-rotatable tapering roller.

9. A projector as defined in claim 7, in which said coupling member is mounted on a slide movable parallel to said optical axis, further comprising a spring member tending to move said slide forwardly, and an abutment portion on said slide held in engagement with the mount of said lens by said spring, so that said slide is coupled to said lens to move therewith as the lens moves axially.

10. A projector as defined in claim 9, further comprising spring means tending to keep said coupling member engaged with said friction member, an electromagnet mounted on said slide and effective, when energized, to move said coupling member out of engagement with said friction member, and electric circuit means for energizing said electromagnet and concomitantly operating said motor means to move said projection lens axially.

11. In a slide projector comprising means for holding a picture slide in projection position, a projection lens member movable in the direction of its optical axis for projecting an image of said slide onto a viewing screen, a carriage member movable substantially in the direction of said optical axis, automatic focusing light beam projecting and receiving means including a part mounted on said carriage member to move therewith, and motor means controlled at least in part by said focusing light beam projecting and receiving means for moving said projection lens member axially, the improvement comprising:
  a driving element operatively connected to said lens member to move therwith when said lens member is moved axially by said motor means;
  a driven element operatively connected to said carriage member to cause movement of said carriage member substantially in the direction of said optical axis when said driven element is moved by said driving element;
  one of said elements being movable into and out of contact with the other of said elements to establish and disestablish a driving connection between said elements;
  spring means tending to hold said elements in position to establish a driving connection; and
  means including an electromagnet for moving one of said elements out of contact with the other of said elements against the force of said spring means, so that said motor means may move said lens member without exerting any force tending to move said carriage member, so long as said driven element is out of contact with said driving element, and may move said carriage member simultaneously with movement of said lens member, so long as said driving and driven elements are in effective driving contact with each other.

12. The invention as defined in claim 11, wherein one of said elements is an elongated member extending in the general direction of said optical axis, and is pivoted to swing toward and away from the other of said elements, various portions of the length of said elongated member being engageable with the other of said elements, depending upon the spatial relationship of said lens member to said carriage member.

* * * * *

UNITED STATES PATENT OFFICE
CERTIFICATE OF CORRECTION

Patent No. 3,861,794              Dated January 21, 1975

Inventor(s) Reinhard Sobotta

It is certified that error appears in the above-identified patent and that said Letters Patent are hereby corrected as shown below:

On the cover sheet [73] "Roller-Werke Franke & Heidecke"

should read  -- Rollei-Werke Franke & Heidecke --.

Signed and sealed this 1st day of July 1975.

(SEAL)
Attest:

RUTH C. MASON
Attesting Officer

C. MARSHALL DANN
Commissioner of Patents
and Trademarks